United States Patent
Turner et al.

(10) Patent No.: US 7,474,879 B2
(45) Date of Patent: Jan. 6, 2009

(54) POWER SUPPLY

(75) Inventors: Geoffrey Alan Turner, New South Wales (AU); Trevor Smith, New South Wales (AU); Pierre Mars, New South Wales (AU)

(73) Assignee: Cap-XX Limited, Dee Why (AU)

( * ) Notice: Subject to any disclaimer, the term of this patent is extended or adjusted under 35 U.S.C. 154(b) by 377 days.

(21) Appl. No.: 10/570,204

(22) PCT Filed: Sep. 9, 2003

(86) PCT No.: PCT/AU03/01175

§ 371 (c)(1),
(2), (4) Date: Mar. 2, 2006

(87) PCT Pub. No.: WO2004/023637

PCT Pub. Date: Mar. 18, 2004

(65) Prior Publication Data

US 2006/0264189 A1    Nov. 23, 2006

(30) Foreign Application Priority Data

Dec. 23, 2002  (WO) .................... PCT/AU02/01762
Aug. 29, 2003  (WO) .................... PCT/AU03/01117
Sep. 9, 2003   (AU)  .................... 2002951291

(51) Int. Cl.
*H04B 1/04* (2006.01)

(52) U.S. Cl. .................... 455/127.1; 320/166; 320/167; 307/109; 363/59

(58) Field of Classification Search .............. 455/127.1; 320/166, 167
See application file for complete search history.

(56) References Cited

U.S. PATENT DOCUMENTS 5,345,154 A * 9/1994 King .......................... 318/49

(Continued)

FOREIGN PATENT DOCUMENTS

WO        WO 01/89058 A1    11/2001

(Continued)

OTHER PUBLICATIONS

Avxcorp.com, "BestCap Supercapacitors" (online), (retrieved on Feb. 13, 2002), Retrieved from the Internet <URL:http://web.archive.org/web/20020213074610/wwwavxcorp.com/prodinfo_product-detail.asp?I=917&ParentID=42>.

(Continued)

*Primary Examiner*—Matthew D. Anderson
*Assistant Examiner*—Hai V Nguyen
(74) *Attorney, Agent, or Firm*—Kenyon & Kenyon LLP

(57) ABSTRACT

A power supply (1) for a load in the form of a PCMCIA card (2) has and onboard GPRS class (10) module (not shown). The module, and therefore card (2), demands a load current $i_{load}$ that has an average value over time and periodic instantaneous peak values ($i_{peak}$) that are significantly higher than the average value. Power supply (1) includes a pair of input terminals (3) for connecting with a power source in the form of a regulated power supply (4) that is contained within a personal computer (not shown). Supply (4) supplies a source current $i_{input}$ that is less than a predetermines current limit specified for the supply and which is less than the peak load current. A pair of output terminals (5) is electrically connected with terminals (3) and card (2). A supercapacitor device in the form of a single supercapacitor (6) is in parallel with terminals (3, 5) for allowing the load to be supplied the peak load current while maintaining the source current at less than the predetermined current limit.

15 Claims, 4 Drawing Sheets

U.S. PATENT DOCUMENTS

| | | | | |
|---|---|---|---|---|
| 5,402,303 | A * | 3/1995 | Luck et al. | 361/172 |
| 5,572,108 | A * | 11/1996 | Windes | 320/167 |
| 5,661,349 | A * | 8/1997 | Luck | 307/151 |
| 5,764,496 | A * | 6/1998 | Sato et al. | 363/37 |
| 5,898,282 | A * | 4/1999 | Drozdz et al. | 318/139 |
| 6,061,577 | A | 5/2000 | Andrieu et al. | |
| 6,075,331 | A * | 6/2000 | Ando et al. | 318/376 |
| 6,097,973 | A * | 8/2000 | Rabe et al. | 455/572 |
| 6,104,759 | A | 8/2000 | Carkner et al. | |
| 6,373,152 | B1 * | 4/2002 | Wang et al. | 307/150 |
| 6,459,175 | B1 * | 10/2002 | Potega | 307/149 |
| 6,510,043 | B1 * | 1/2003 | Shiue et al. | 361/502 |
| 6,559,621 | B2 * | 5/2003 | Corless et al. | 320/103 |
| 6,579,327 | B1 * | 6/2003 | Shiue et al. | 29/25.03 |
| 6,580,598 | B2 * | 6/2003 | Shiue et al. | 361/502 |
| 6,650,091 | B1 * | 11/2003 | Shiue et al. | 320/166 |
| 6,651,759 | B1 * | 11/2003 | Gruenwald et al. | 180/65.2 |
| 6,654,592 | B2 * | 11/2003 | Friman | 455/127.1 |
| 6,661,643 | B2 * | 12/2003 | Shiue et al. | 361/502 |
| 6,664,766 | B2 * | 12/2003 | Desprez et al. | 320/103 |
| 6,678,147 | B2 * | 1/2004 | Shiue et al. | 361/502 |
| 6,680,548 | B2 * | 1/2004 | Shiue et al. | 307/141 |
| 6,683,395 | B2 * | 1/2004 | Testin et al. | 307/149 |
| 6,700,352 | B1 * | 3/2004 | Elliott et al. | 320/130 |
| 6,774,602 | B2 * | 8/2004 | Ballard et al. | 320/103 |
| 6,835,491 | B2 * | 12/2004 | Gartstein et al. | 429/92 |
| 6,836,097 | B2 * | 12/2004 | Turner et al. | 320/166 |
| 6,847,192 | B2 * | 1/2005 | Turner et al. | 320/166 |
| 6,977,480 | B2 * | 12/2005 | Emori et al. | 320/104 |
| 6,996,389 | B2 * | 2/2006 | Fitzpatrick et al. | 455/343.1 |
| 6,998,822 | B2 * | 2/2006 | Turner et al. | 320/166 |
| 7,002,265 | B2 * | 2/2006 | Potega | 307/149 |
| 7,011,902 | B2 * | 3/2006 | Pearson | 429/13 |
| 7,034,257 | B2 * | 4/2006 | Petrenko | 219/482 |
| 7,042,197 | B2 * | 5/2006 | Turner et al. | 320/136 |
| 7,075,273 | B2 * | 7/2006 | O'Gorman et al. | 322/28 |
| 7,091,701 | B2 * | 8/2006 | Turner et al. | 320/166 |
| 7,096,985 | B2 * | 8/2006 | Charaudeau et al. | 180/65.2 |
| 7,186,473 | B2 * | 3/2007 | Shiue et al. | 429/7 |
| 7,345,454 | B2 * | 3/2008 | Thrap | 320/135 |
| 2002/0139593 | A1 * | 10/2002 | Charaudeau et al. | 180/65.3 |
| 2002/0171397 | A1 * | 11/2002 | Adrian et al. | 320/119 |
| 2003/0090243 | A1 * | 5/2003 | Atherton | 323/239 |
| 2003/0094858 | A1 * | 5/2003 | Shiue et al. | 307/141 |
| 2003/0184256 | A1 * | 10/2003 | Kopf et al. | 320/101 |
| 2003/0214269 | A1 * | 11/2003 | Shiue et la. | 320/166 |
| 2004/0038087 | A1 * | 2/2004 | Shiue et al. | 429/7 |
| 2004/0095098 | A1 * | 5/2004 | Turner et al. | 320/167 |
| 2004/0263127 | A1 * | 12/2004 | Turner et al. | 320/166 |
| 2005/0077880 | A1 * | 4/2005 | Turner et al. | 320/166 |
| 2005/0083021 | A1 * | 4/2005 | Mahon | 320/166 |
| 2005/0110468 | A1 * | 5/2005 | Turner et al. | 320/166 |
| 2006/0043938 | A1 * | 3/2006 | O'Gorman et al. | 322/8 |
| 2006/0061922 | A1 * | 3/2006 | Mihai et al. | 361/20 |
| 2006/0264189 | A1 * | 11/2006 | Turner et al. | 455/127.1 |
| 2007/0159007 | A1 * | 7/2007 | King et al. | 307/71 |
| 2008/0129270 | A1 * | 6/2008 | Kawk et al. | 323/288 |

FOREIGN PATENT DOCUMENTS

WO   WO 03/056684 A1   7/2003

OTHER PUBLICATIONS

Skeleton-Technologies.com. Breakthrough in Supercapacitors (online) (retrieved on Dec. 17, 2001). Retrieved from the Internet <URL:http://web.archive.org/web/20011217070537/www.skeleton-technologies.com/supCap2.htm>.

* cited by examiner

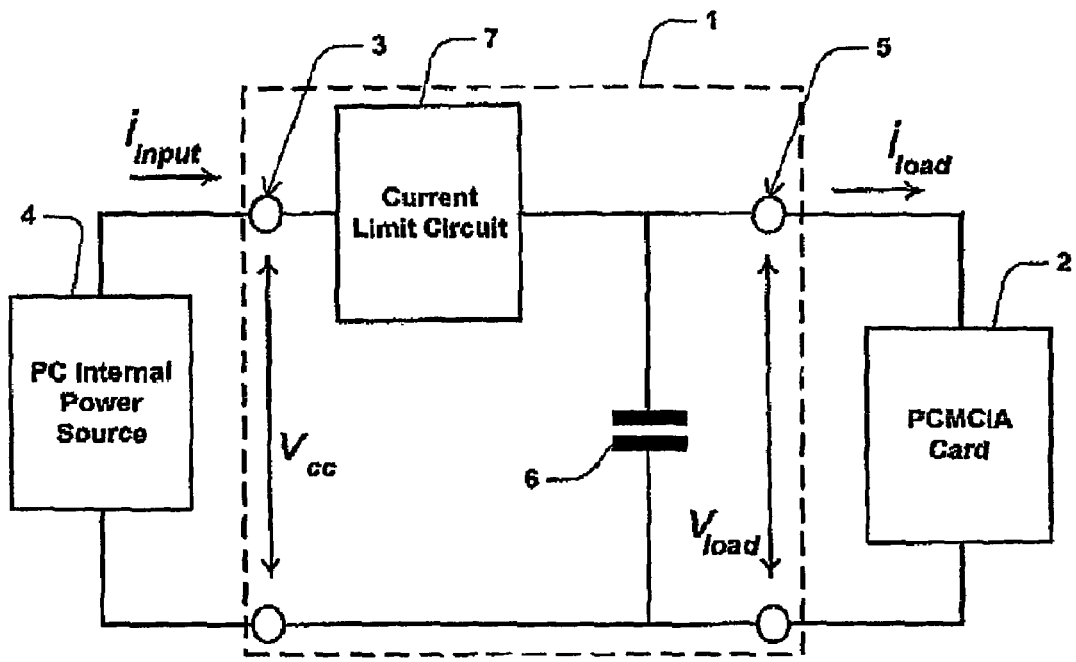
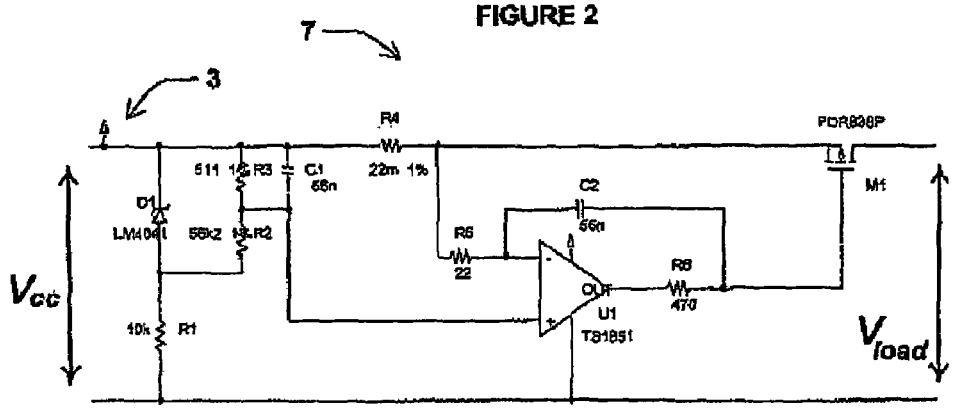

POWER SUPPLY

This is a 371 national phase application of PCT/AU2003/001175 filed 9 Sep. 2003, the content of which is incorporated herein by reference.

FIELD OF THE INVENTION

The present invention relates to a power supply.

The invention has been developed primarily for use with a GPRS communications module for a PCMCIA card and will be described hereinafter with reference to that application. It will be appreciated, however, that the invention is not limited to that particular field of use and is also suitable for other communications modules such as a GSM module or a Mobitex module, whether included in a PCMCIA card, a Compact Flash card, or any other communications module for a notebook computer, a laptop computer, a Tablet computer, a wireless LAN device or other computing devices.

BACKGROUND ART

Known mobile communications modules, such as GPRS modules, are used in PCMCIA cards. The modules include a number of integrated circuits that collectively function to allow information to be processed and transmitted in accordance with the required communications standard. In the case of GPRS modules the information is usually non-voice data, although voice data is transmitted similarly.

The design of portable computing devices such as laptop computers and PDA's is strongly driven to minimize while maximizing the period between recharging of the battery. This suggests that the battery should have as high an energy density as possible. However, batteries of this type typically have a high time constant and are therefore compromised in their ability to provide the required voltage and current during the high power mode of the typical communications modules used in these devices. Accordingly, the more usual compromise is to tolerate a lower power density—and therefore a shorter battery life—but gain a shorter time constant.

In partial answer to this problem, it has been known to use a bank of parallel tantalum capacitors to assist the battery during the high power mode. While some small advantage is gained, this is usually not justified by the cost and bulk of these capacitors.

The design of wireless communication devices for wireless LANs, PCMCIA cards and the like, is driven to achieve the desired functionality while also minimizing volume, peak power consumption and cost. In contrast, the demands for increased functionality and wider bandwidth communication usually require more volume, higher peak power and higher cost. These competing considerations place an increased premium on PCB "real estate", packaging volumes and component costs as designers attempt to get more from less.

In any event, these cards are reliant upon the hots computing device supplying the required power. Increasingly it is being found that the host has a specified current limit for the card that is less than the peak current demanded. That is, for the card to operate it will have to do so outside the power supply specification of the host. While this may not be catastrophic in all cases, it is highly undesirable and, ultimately, unsustainable if system stability is required.

Accordingly, for both portable and mains supplied devices the increasing demands for communication flexibility is being compromised and hindered, if not prevented, by power supply limitations.

Any discussion of the prior art throughout the specification should in no way be considered as an admission that such prior art is widely known or forms part of common general knowledge in the field.

DISCLOSURE OF THE INVENTION

It is an object of the invention, at least in the preferred embodiment, to overcome or substantially ameliorate one or more of the disadvantages of the prior art, or at least to provide a useful alternative.

According to a first aspect of the invention there is provided a power supply for a load that demands and average load current and a peak load current that is higher than the average load current, the power supply including:

input terminals for electrically connecting with a power source that supplies a source current that is less than a predetermined current limit, wherein the predetermined current limit is less than the peak load current;

output terminals for electrically connecting with the input terminals and the load; and a supercapacitor device in parallel with the output terminals for allowing the load to be supplied the peak load current while substantially maintaining the source current at less than about the predetermined current limit.

Preferably, the predetermined current limit is between the average load current and the peak load current.

Preferably also, the voltage at the input terminals is greater than or equal to the voltage at the output terminals. More preferably, the power supply maintains the input and the output terminals at substantially the same voltage.

In a preferred form, the supercapacitor device includes one or more supercapacitors in parallel with the output terminals. More preferably the power supply includes a current limiter disposed between the input terminals and the output terminals. Even more preferably, the current limiter maintains the source current at less than the predetermined current limit during charging of the supercapacitive device from the power source.

Preferably, the supercapacitor device includes a plurality of supercapacitors that are connected in parallel with each other. However, in other embodiments the supercapacitors are connected in series with each other.

Preferably also, the supercapacitor device has an ESR of less than about 120 m$\Omega$. More preferably, the supercapacitor device has an ESR of less than about 100 m$\Omega$. In some embodiments, the supercapacitor device is selected to have an ESR of less than 80 m$\Omega$, while in other embodiments, the supercapacitor device is selected to have an ESR of less than 30 m$\Omega$. More preferably, the supercapacitor device has an ESR of less tan 24 m$\Omega$. Even more preferably, the supercapacitor device has an ESR of less than 20 m$\Omega$.

In a preferred form, the supercapacitor device provides a capacitance of at least about 0.4 Farads. More preferably, the footprint of the device is less than about 800 m$^{2.}$ Even more preferably, the footprint of the device is less tan about 40mm$\times$20 mm.

Preferably, load is a communications device. More preferably, the communications device includes a GPRS module or a GSM module. Even more preferably, the load is a card for a computer, and the communications device is mounted to the card. In these embodiments the power source is derived from the internal power supply of the computer.

In a preferred form, the current limiter includes a variable resistance device disposed between the input and the output terminals for providing a predetermined resistance. More preferably, the variable resistance device is a semiconductor device. Even more preferably, the current limiter includes a current sensor disposed between the input and the output terminals for providing a signal indicative of the source current, wherein the variable resistance device is responsive to the signal for setting the predetermined resistance. In an embodiment, the sensor is a low value resistance and the semiconductor device is MOSFET.

Preferably, the variable resistance device is responsive to the signal to selectively operate in one of a high resistance mode; a low resistance mode; and a linear resistance mode. For example, where the variable resistance device is a MOSFET, the high, low and linear resistance modes correspond to the MOSFET being switch OFF, switched ON, and biased for linear operation. It will be appreciated that the linear resistance mode simply implies some correlation, as is known for such semiconductor device, between the signal and the resistance although this need not be exactly proportional.

Preferably also, the variable resistance device operates in the low resistance mode while the load current is less than about the predetermined current limit. More preferably, the variable resistance device operates within the linear mode when the source current approaches the predetermined current limit. Even more preferably, the variable resistance device, when operating within the linear mode, provides an increasing resistance as the source current approaches the predetermined current limit.

In a preferred form, under normal operating conditions, the load includes a start-up phase where the supercapacitor device requires charging, wherein the supercapacitor device is selected such that the current limiter is typically operational only during the start-up phase of the load. That is, during normal operation, the supercapacitor device has sufficient capacity to supply the peak currents, and be recharged by the supply current between the peaks, while containing the supply current below the predetermined current limit. In other embodiments, however, the current limiter is operational also during the current peaks. In the latter embodiments, the supercapacitor provides a greater proportion of the peak current.

According to a second aspect of the invention there is provided a communications card for a computer, the computer having a power source that provides a source curt for the card that is less than a predetermined current limit, the card including:

a substrate for supporting a plurality of electrical components that collectively define a load that demands a peak load current that is greater than the predetermined current limit and an average load current that is less than the peak load current;

input terminals for electrically connecting with the power source;

output terminals for electrically connecting with the input terminals and the load; and a supercapacitor device in a parallel with the output terminals for allowing the load to be supplied the peak load current while the substantially limiting the source current to less than about the predetermined current limit.

According to a third aspect of the invention there is provided a computing device including:

a communication card for allowing the computer to communicate with other computing devices wherein, in use, the card demands a peak load current and an average load current that is less than the peak load current;

power source for supplying a source current to the card, the power source having a predetermined current limit that is less than the peak load current;

input terminals for electrically connecting with the power source;

output terminals for electrically connecting with the input terminals and the card; and a supercapacitor device in a parallel with the output terminals for allowing the card to be supplied the peak load current while substantially limiting the source current to less than about the predetermined current limit.

According to a fourth aspect of the invention there is provided a current limiter including:

input terminals for electrically connecting with a power source that supplies a source current that is less than a predetermined current limit, wherein the predetermined current limit is less than the peak load current; and output terminals for electrically connecting with the input terminals and the load and for electrically connecting to parallel with a supercapacitor device for allowing the load to be supplied the peak load current while substantially maintaining the source current at less than about the predetermined current limit.

Even more preferably, the current limiter maintains the source current at less than the predetermined current limit during charging of the supercapacitive device from the power source.

In a preferred form, the current limiter includes a variable resistance device disposed between the input and the output terminals for providing a predetermined resistance. More preferably, the variable resistance device is a semiconductor device. Even more preferably, the current limiter includes a current sensor disposed between the input and the output terminals for providing a signal indicative of the source current, wherein the variable resistance device is responsive to the signal for setting the predetermined resistance. In an embodiment, the sensor is a low value resistor and the semiconductor device is a MOSFET.

Preferably, the variable resistance device is responsive to the signal to selectively operate in one of a high resistance mode; a low resistance mode; and a linear resistance mode. For example, where the variable resistance device is a MOSFET, the high, low and linear resistance modes correspond to the MOSFET being switched OFF, switched ON, and biased for linear operation. It will be appreciated that the linear resistance mode simply implies some correlation, as is known for such semiconductor device, between the signal and the resistance although this need not be exactly proportional.

Preferably also, the variable resistance device operates in the low resistance mode while the load current is less than about the predetermined current limit. More preferably, the variable resistance device operates within the linear mode when the source current approaches the predetermined current limit. Even more preferably, the variable resistance device, when operating within the linear mode, provides an increasing resistance as the source rent approaches the predetermined current limit.

In a preferred form, under normal operating conditions, the load includes a start-up phase where the supercapacitor device requires charging, wherein the supercapacitor device is selected such that the current limiter is operational only during the start-up phase of the load. That is, during normal operation, the supercapacitor device has sufficient capacity to supply the peak currents, and be recharged by the supply current between the peaks, while containing the supply current below the predetermined current limit.

According to a fifth aspect of the invention there is provided a method for supplying a load that demands an average load current and a peak load current that is higher than the average load current, the method including:

electrically connecting input terminals with a power source that supplies a source current that is less than a predetermined current limit, wherein the predetermined current limit is less than the peak load current;

electrically connecting output terminals with the input terminals and the load; and providing a supercapacitor device in a parallel with the output terminals for allowing the load to be supplied the peak load current while substantially maintaining the source current at less than about the predetermined current limit.

According to a sixth aspect of the invention there is provided a method for supplying a communications card for a computer, the computer having a power source that provides a source current for the card that is less than a predetermined current limit and the card including a substrate for supporting a plurality of electrical components that collectively define a load that demands a peak load current that is great than the predetermined current limit and an average load current that is less than the peak load current, the method including:

electrically connecting input terminals with the power source;

electrically connecting output terminals with the input terminals and the load; and providing a supercapacitor device in parallel with the output terminals for allowing the load to be supplied the peak load current while substantially limiting the source current to less than about the predetermined current limit.

According to a seventh aspect of the invention there is provided a method of supplying a communications card within a computing device, the method including:

electrically connection the communications card with the computer for allowing the computer to communicate with other computing devices wherein, in use, the card demands a peak load current and an average load current that is less than the peak load current;

supplying a source current to the card with a power source that has a predetermined current limit that is less than the peak load current;

electrically connecting input terminals with the power source;

electrically connecting output with the input terminals and the card; and a supercapacitor device in a parallel with the output terminals for allowing the card to be supplied the peak load current while substantially limiting the source current to less than about the predetermined current limit.

According to and eighth aspect of the invention there is provide a method of limiting current, the method including:

electrically connecting input terminals with a power source that supplies a source current that is less than a predetermined current limit, wherein the predetermined current limit is less than the peak load current; and electrically connecting output terminals with the input terminals and the load and for electrically connecting in parallel with a supercapacitor device for allowing the load to be supplied the peak load current while substantially maintaining the source current at less than about the predetermined current limit.

the term "computer" includes both mains connected and portable computing equipment such as, for example, desktop computers, laptop computers, PDA's and cellular telephones. The term "card" includes, for example, CompactFlash Cards, PCMCIA cards, modem cards and other communications cards.

Unless the context clearly requires otherwise, throughout the description and the claims, the words 'comprise', 'comprising', 'include', 'including' and the like are to be construed in an inclusive sense as opposed to an exclusive or exhaustive sense; that is to say, in the sense of "including, but not limited to". Additionally, unless the context clearly requires otherwise, throughout the description and the claims, the words 'connected' and 'electrically connected' are used as equivalents to describe or define an electrical connection between two or more elements. It will be understood that an electrical connection need not be a direct electrical connections and includes an indirect electrical connection between the respective elements.

BRIEF DESCRIPTION OF DRAWINGS

Preferred embodiments of the invention will now be described, by way of example only, with reference to the accompanying drawings and appendix in which:

FIG. 1 is a schematic circuit diagram of a power supply according to the invention;

FIG. 2 is a more detailed circuit diagram of the current limit circuit used in the power supply of FIG. 1;

PREFERRED EMBODIMENTS OF THE INVENTION

Figure 3:
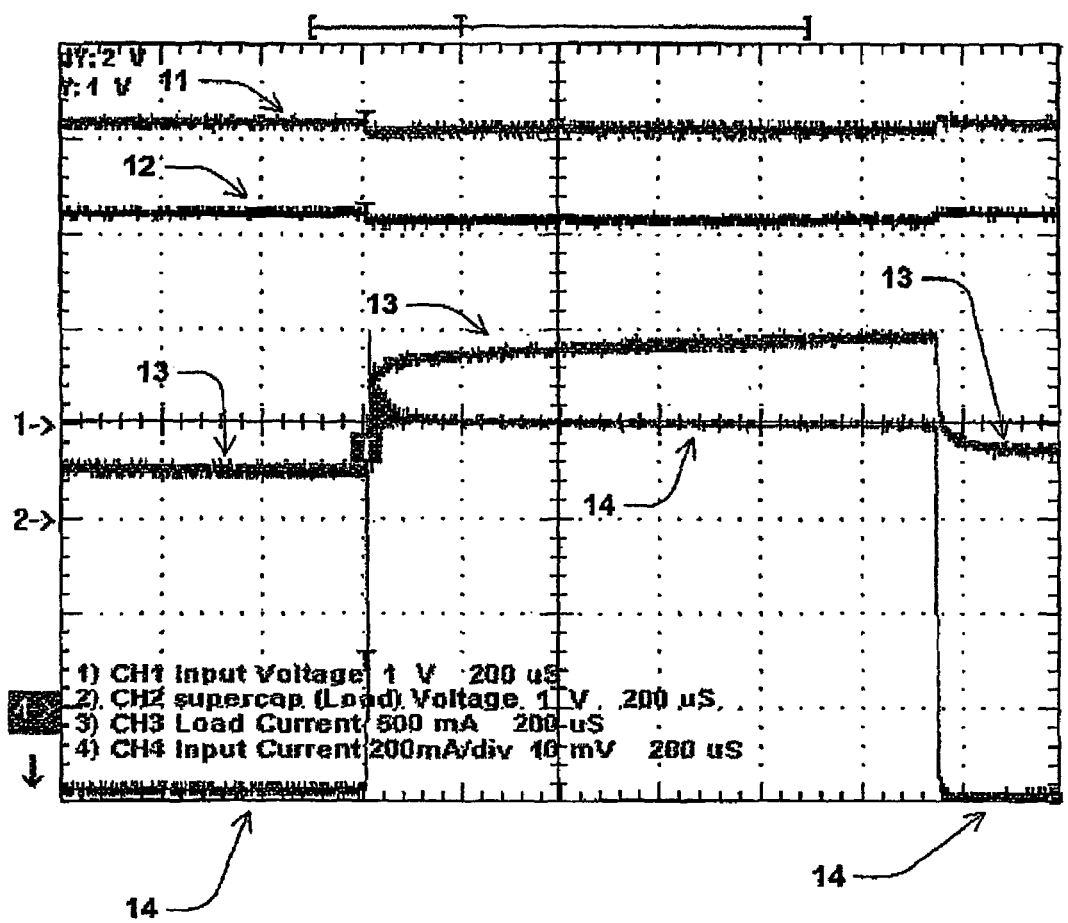
FIG. 3 is an oscilloscope image including a number of traces for the power supply of FIG. 1.

Referring to FIG. 1 there is illustrated schematically a power supply 1 for a load in the form of a PCMCIA card 2 that has an onboard GPRS Class 10 module (not shown). The module, and therefore card 2, demands a load current $i_{load}$ that has an average value over time and periodic instantaneous peak values ($i_{peak}$) that are significantly higher than the average value. Power supply 1 includes a pair of input terminals 3 for electrically connecting with a power source in the form of a regulated power supply 4 that is contained within a personal computer (not shown). Supply 4 supplies a source current $i_{input}$ that is less than a predetermined current limit specified for the supply and which is less than the peak load current. A pair of output terminals 5 is electrically connected with terminals 3 and card 2. A supercapacitor device in the form of a single supercapacitor 6 is in parallel with terminals 3 and 5 for allowing the load to be supplied the peak load current while maintaining the source current at less than the predetermined current limit Power supply 4 has a specification that sets the predetermined current limit at 1 Amp for each card within the computer. In other embodiments the predetermined current limit is different.

It will be appreciated by those skilled in the art that card 1 is but one of a number of cards within the computer, where those cards offer respective functionalities for the user of the computer. For the GPRS functionality, however, a usual GPRS transmitter needs 1.5 Amps to 2 Amps to transmit at full power at the regulated supply voltage of 3.3 Volts. For example, when transmitting in class 10 using a maximum of two of the eight 577 ms time slots, the pulse duration is 1.154 ms and the period 4.616 ms. It is not possible for prior art cards to supply this load and remain within specification without additional complication and expense such as the use of a secondary battery to provide peak power to the card. In the embodiment illustrated in FIG. 1, however, supercapacitor 6 has a high capacitance and a low ESR (equivalent series resistance) and is thereby able to deliver large current pulses without large voltage swings at terminals 5. That is, the ripple in $V_{load}$ is small and allows the load current $i_{load}$ to meet the peak current demands of card 2 during transmission. In these circumstances $i_{load}$ exceeds the predetermined current limit, while $i_{input}$ does not. That is, supply 1 has a load-leveling effect that allows current drawn from the source 4 during the load pulses to be contained within the range allowed by the PC card specification.

An important criterion in selecting supercapacitor 6 is low ESR, as ESR is typically the major contributor to the voltage ripple for high capacitance devices. However, when card 2 is first plugged into supply 4, supercapacitor 6 is usually in a discharged state. Accordingly, the lower the ESR the higher will be the initial charging current into supercapacitor 6. To prevent the supercapacitor's initial charging current from overloading supply 4, supply 1 includes a current-limit circuit 7. This circuit limits $i_{input}$ to just less than the peak current supply that is specified for card 2. A more detailed illustration of circuit 7 is provided in FIG. 2. It will be appreciated by those skilled in the art that during normal operation—that is, following the initial charging of supercapacitor 6—circuit 7 is effectively inoperative and presents only minimal impedance.

Supercapacitor 6 enables card 2 and the GPRS module to operate within specification even though $i_{load}$ during the periodic peak times exceeds the value allowed by supply 4. This is done with substantially 100% efficiency, instead of the lower efficiency and higher cost of a DC-DC converter. Additionally, supercapacitor 6 does not generate EMI. That is, it is the action of supercapacitor 6 that limits the peak current load upon source 4 during normal operation of card 2. Circuit 7, during that normal operation, is not used to effect that current limiting. Stating this in different terms, supercapacitor 6 is designed to limit $i_{input}$ during normal usage to not only fall below the specification of supply 4, but also to prevent circuit 7 from activating. In other embodiments, however, circuit 7 is designed to limit $i_{input}$ during a peak current period such that a greater proportion of the required current is drawn from the supercapacitor. This allows the use of a supercapacitor having a higher ESR. The constraint is that as the supercapacitor discharges to provide the peak current, the output voltage provided by the supercapacitor falls. However, this is accommodated so long as the capacitance of the supercapacitor is large enough—light of the volume constraints encountered—to ensure the voltage remains above the acceptable minimum for the load. Accordingly, in these embodiments, the supercapacitor is selected to have a combination of capacitance and ESR that, for the given footprint and/or volume constraints, contains the voltage droop such that the input voltage does not fall below the minimum voltage required by the load during the peak current period.

The amount of energy that supply 4 is able to deliver in a typical pulse period is able to be compared with the energy required by card 2 by performing a simple energy balance. If the load has a duty cycle of D (where $0 < D \leq 1$) and the load current has a continuous component of $I_{steady}$ and pulse of $i_{peak}$ (in addition to $I_{steady}$) then the average power drawn during one cycle is:

$$P_{ave} = V_{cc}(I_{steady} + D \cdot i_{peak})$$

The maximum average power that may be drawn from the supply is given by $$P_{ave, max} = V_{cc} \cdot I_{max}$$

Where $I_{max}$ is given by the PC Card specification as 1 Amp. $P_{ave}$ must be less than $P_{ave, max}$ for the load to function. Combining the above equations, the following must be satisfied:

$$I_{steady} + D \cdot i_{peak} < I_{max}$$

While this equation is true for an ideal, infinite capacitor, some margin is allowed for voltage ripple in a real device. For the illustrated embodiment, the GPRS module is run in Class 10 mode on a card 2. Use is made of 2 slots out of 8 to provide a 25% duty cycle, and the card draws 100 mA continuously plus 1.9 Amps peak pulse transmission current. Given this, $I_{steady} + D \cdot i_{peak} = 0.1 + 0.25 \times 1.9$ Amps = 0.575 Amps, which is well under the 1 Amp limit. This ignores losses, but gives an approximate magnitude of the current that will be drawn from supply 4.

The oscilloscope image of FIG. 3 illustrates the traces for the circuit of FIG. 1 The x-axis is in units of time, while the y-axis is in units of voltage for the top two traces and current for the bottom two traces.

Supercapacitor 6 is a 0.25 Farad 40 mΩ device. The supply voltage $V_{cc}$ from supply 4 is 3.3 Volts at a supply impedance of 200 mW. A load is imposed by a card 2 of a 1.9 A pulse for a 1.154 ms every 4.616 ms. That is, a Class 10 (2-slot) transmission. Progressing from the top to the bottom of the traces provided in FIG. 3, there is shown:

The input voltage, that is, $V_{cc}$—designated by reference numeral 11.

The load voltage that is, $V_{load}$—designated by reference numeral 12.

The current drawn from supply 4, that is, $i_{input}$—designated by reference numeral 13.

The current drawn by the GPRS module, that is, $i_{load}$—designated by reference numeral 14.

It should also be noted that zero is the bottom graticule in the traces.

Due to the use of supply 1 there is no point in the cycle where $i_{input}$ exceeds the 1 Amp specification of supply 4. Moreover, this is achieved simultaneously with $i_{load}$ satisfying the peak current demands of card 2.

It is of interest to note that increasing the impedance of supply 4 or adding resistance to circuit 7 results in a reduced peak input current. However, the tradeoff is a reduced minimum and average output voltage.

The table below, Table 1, contains some examples of supercapacitors that work in the above example with a 2 Amp maximum load current. The "Type No." is the model number allocated to the devices by cap-XX Pty Ltd, a manufacturer and supplier of supercapacitor devices.

In other embodiments use is made of supercapacitors, or supercapacitor devices, with a total ESR of up to 80 mΩ. It will be appreciated, however, from the teaching herein, that those supercapacitors or supercapacitor devices with lower ESR will perform better in the context of the present embodiments, and will also provide more headroom.

Those supercapacitors listed in Table 1 that are rated for 2.3 Volts operation, two are combined in series for use with supply 4 given the operational voltage is 3.3 Volts. Where lower operational voltages are used a single one of the supercapacitors is suitable. Moreover, the higher voltage applications more than two supercapacitors are connected in series.

TABLE 1

| Capacitance (Farads) | ESR (mΩ) | Voltage (Volts) | Footprint (mm × mm) | Thickness (mm) | Type No. |
|---|---|---|---|---|---|
| 0.18 | 60 | 4.5 | 28.5 × 17 | 2.79 | GW202 |
| 0.35 (each) | 30 (each) | 2.3 | 28.5 × 17 | 1.36 | GW102 (x2) |
| 0.2 | 50 | 4.5 | 39 × 17 | 2.06 | GS203 |
| 0.4 (each) | 26 (each) | 2.3 | 39 × 17 | 0.99 | GS103 (x2) |

The supercapacitor in Table 1 are all designed such that the current limiter need only operate during start-up of the device. However, for those embodiments where the current limiter also operates during peak load current periods, suitable supercapacitor devices are designed by cap-XX Pty Ltd by respective Type No.'s GW209, GW214, HS201, and GS204. It will be appreciated from the teaching herein that equivalent supercapacitor devices are also suitable.

The supercapacitor devices referred to in the preceding paragraph typically thinner and therefore more easily packaged into a given device. However, they also have a higher ESR than those device referred in Table 1. However, for the applications describes in the embodiments, these supercapacitor devices still have a sufficiently low ESR and a sufficiently high capacitance, notwithstanding the small packaged size, to provide the desired functionality. That is, when properly applied, the higher ESR supercapacitor devices do not allow the voltage at the load to drop below the minimum required, even in light of the operation of the current limiter in the peak current period.

In all the preferred embodiments describes herein, use is made of supercapacitor devices having an ESR of less than about 120 mΩ. However, in other embodiments, the supercapacitor device has an ESR of less than about 100 mΩ. In some embodiments, the supercapacitor device is selected to have an ESR of less than 80 mΩ, while in other embodiments, the supercapacitor device is selected to have an ESR of less than 30 mΩ. For particular embodiments, the supercapacitor device is selected to have an ESR of less than 24 mΩ, while in other embodiments, the supercapacitor device has an ESR of less than 20 mΩ.

Other supercapacitor devices that are suitable for use in the embodiments of the invention are disclosed in a co-pending PCT patent application PCT/AU03/01117 filed on 29 Aug. 2003 in the name of Energy Storage System Pty Ltd and entitled "A Power Supply For A Communications Module That Demands High Power During Predetermined Periods". The disclosure within that application is incorporated herein by way of cross-reference.

In other embodiments (not shown) card 2 includes a communications module in the form of a GPRS Class 12 module. While the principle of operation remains the same, the parameters of the supercapacitor used are different to account for the requirements of the different module. For example, it is possible to run a transmitter in class 12 mode on a PC Card using four slots out of eight, which is a 50% duty cycle. If the card draws 100 mA continuously plus 1.8 Amps peak pulse transmission current then $I_{steady}+D \cdot i_{peak}=0.1+0.5 \times 1.8$ Amps×1.0 Amp, which is at the 1 Amp limit. This ignores losses, so a 1.8 Amp pulse is the maximum that could be supported in an ideal circuit. In a real circuit, the pulse load that can be supported will necessarily be less, and the preferred design parameter is 1.5 Amps. Such a 1.5 Amp pulse results in an average of 0.85 Amps, which leaves some headroom and allowance for losses.

Figure 4:
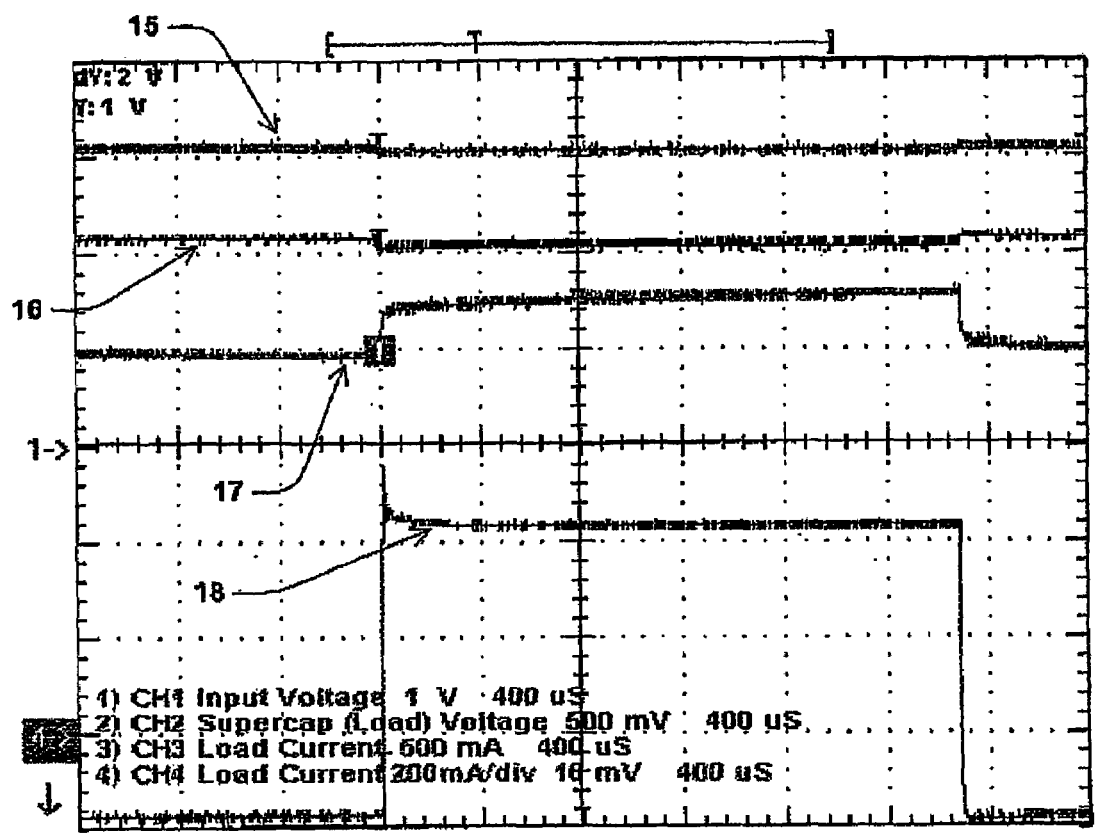
FIG. 4 is an oscilloscope image including a number of traces for an alternative embodiment of a power supply according to the invention.

An embodiment of the invention that is specifically designed for operation with a PC card having a GPRS Class 12 module includes a supercapacitor that has a capacitance of 0.48 Farads and ESR of 20 mΩ. Again, the source voltage ($V_{cc}$) is 3.3 Volts and supply 4 provides 200 mΩ source impedance. A class 12 (4-slot) transmission includes about a 100 mA continuous load, and a 1.5 Amp maximum pulse for 2.308 ms every 4.616 ms. There is shown in FIG. 4 a set of oscilloscope traces that correspond with the traces of FIG. 3, but which relate to a GPRS Class 12 module together with the supercapacitor referred to immediately above. That is, progressing from the top trace to the bottom trace, there is illustrated:

the input voltage, that is, $V_{cc}$—designated by reference numeral 15.

The load voltage, that is, $V_{load}$—designated by reference numeral 16.

The current drawn from supply 4, that is, $i_{input}$—designated by reference numeral 17.

The current drawn by the GPRS module, that is, $i_{load}$—designated by reference numeral 18.

Again, due to the use of the supercapacitor $i_{input}$ does not exceed the 1 Amp specification and the load voltage $V_{load}$ remains above 3V.

Adding extra source resistance is a means to reduce the maximum current drawn from supply 4, but it is not advisable in applications in which $V_{load}$ is close to the acceptable minimum.

Examples of supercapacitors that are suitable for use with the GPRS Class 12 module referred to above listed in Table 2. The design parameters being assumed are a 1.6 Amp maximum load current and that $V_{load}$ is maintained above 3 Volts.

Similarly with the Class 10 examples, the lower the resistances and the ESR of the supercapacitor used, the better the ripple voltage will be and the more voltage headroom there will be.

TABLE 2

| Capacitance (Farads) | ESR (mΩ) | Voltage (Volts) | Footprint (mm × mm) | Thickness (mm) | Type No. |
|---|---|---|---|---|---|
| 0.45 | 24 | 4.5 | 39 × 17 | 3.9 | GS205 |
| 0.95 (each) | 12 (each) | 2.3 | 39 × 17 | 1.91 | GS105 (x2) |
| 1.4 | 20 | 4.5 | 39 × 17 | 4.99 | GS208 |
| 2.7 (each) | 10 (each) | 2.3 | 39 × 17 | 2.46 | GS108 (x2) |

The invention is also applicable to other operating environments such as CompactFlash Cards including a GPRS or a GSM modem. These cards are typically limited to a current drain of 0.5 Amps, which at a supply voltage of 3.3 Volts, is considerably less than the 1.5 to 2 Amps that the modem requires to transmit at full power. The arrangement is conceptually similar to FIG. 1, where card 2 represents the CompactFlash Card including the modem, and supercapacitor 6 represents a supercapacitor selected for this environment.

To illustrate this additional embodiment reference is made to the following specific example. Particularly, the modem is configured to transmit in class 8 mode on a CF+Card, using 1 slot out of 8, which translates to a 12.5% duty cycle. The card draws 100 mA continuously, plus 1.9 Amps peak pulse transmission current. Using the above equations, $I_{steady}+D \cdot i_{peak}=0.1+0.125 \times 1.9$ Amps=0.34 Amps, which is well under the 0.5 Amp limit. This calculation ignores losses, but gives an approximate magnitude of the current that will be drawn from the source when using a supercapacitor.

The supercapacitor used in this embodiment has a capacitance of 0.25 Farad and an ESR of 40 mΩ. Supply 4 provides a source voltage $V_{cc}$ of 3.3 Volts and has a source impedance of about 200 mΩ. The CompactFlash Card draws about 100 mA continuous and a 1.65 Amp pulse for 0.577 ms every 4.616 ms due to the Class 8 (1-slot) transmission. It will be appreciated that the peak source current in practice is higher than the ideal value predicted above, but this is to be expected when taking source resistance and supercapacitor ESR into account.

In other embodiments where CompactFlash Cards are used, the supercapacitor is chosen to have a lower ESR than that used in the above example to allow for some headroom and/or to support a transmitter that draws a higher current.

The table below, Table 3, contains examples of supercapacitors that are also suitable for the embodiments having CompactFlash Cards. These devices allow the load to stay within specification by drawing less than the 0.5 Amp limit. Again, where the specified voltage of the listed supercapacitors is less than the operational voltage of the application, then two like devices are connected in series.

TABLE 3

| Max $i_{load}$ (Amps) | Capacitance (Farads) | ESR (mΩ) | Voltage (Volts) | Footprint (mm × mm) | Thickness (mm) | Type No. |
| --- | --- | --- | --- | --- | --- | --- |
| 1.75 | 0.45 | 24 | 4.5 | 39 × 17 | 3.9 | GS205 |
| 1.75 | 0.95 | 12 | 2.3 | 39 × 17 | 1.91 | GS105 (x2) |
| 1.65 | 0.35 | 32 | 4.5 | 28.5 × 17 | 4.63 | GW210 |
| 1.65 | 0.65 | 16 | 2.3 | 28.5 × 17 | 2.28 | GW110 (x2) |

Figure 5:
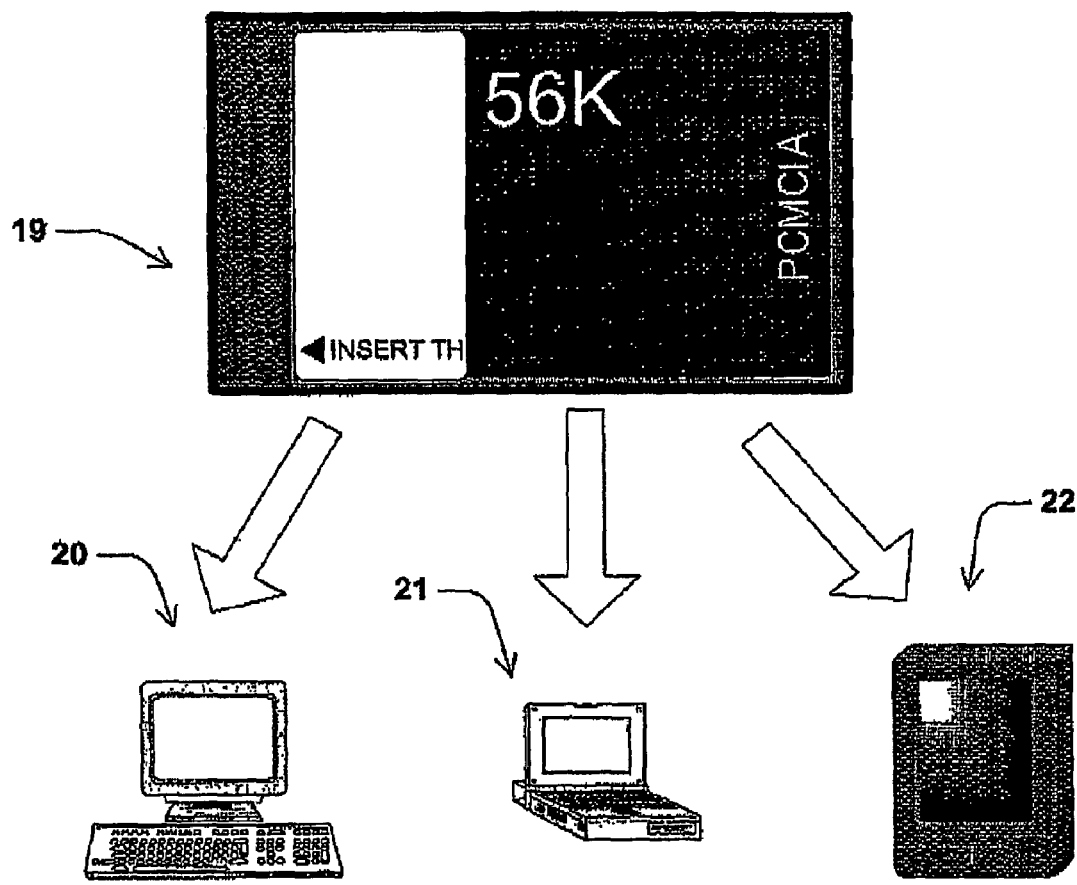
FIG. 5 is a schematic representation of a PCMCIA card of one embodiment of the invention.

Reference is now made to FIG. 5 where there is illustrated a PCMCIA card 19. This card conforms to the standard dimensions and is configured for insertion into a complementary port of a desktop computer 20, a laptop computer 21 and a PDA 22. It will be appreciated the such a card or a like card is also able to be fitted to other computing devices.

Card 19 includes a communications module to provide the computing device into which it is installed to communicated with a remote system. It also includes a power supply in accordance with the invention (not shown) to ensure that card 19 remains within specification while the communication is affected.

In other embodiments, however, the power supply according to the invention is mounted within computer 20 or 21 or PDA 22 and not directly to card 19.

Figure 6:
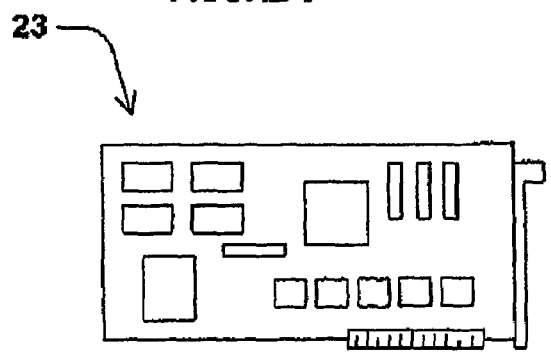
FIG. 6 is a schematic representation of an alternative communication card according to the invention; and Appendix A is numbered as pages 22 to 35 of this specification and is an "Application Note" developed by the inventors.

Another embodiment of the invention, in the form of a communications card 23, is illustrated in FIG. 6. Card 23 is configured for mounting within a computer or other computing device, and includes a GPRS module (not specifically shown) and a power supply according to the invention (also not specifically shown). The usual current drain limit on such a device is 1 Amp notwithstanding the 1.5 to 2 Amp peak requirement of the GPRS module. However, card 23 is able to remain within specification through inclusion of a power supply according to the invention.

An embodiment of the invention similar to the provided in FIG. 2 is detailed in FIG. 3 of co-pending PCT patent application no. PCT/AU02/0176. The disclosure contained within that earlier application is incorporated herein by way of cross-reference.

Additional design considerations for embodiments of the invention are provide in the following Appendix A. This Appendix is an Application Note developed by the inventors and is incorporated as part of the disclosure within this patent specification.

The above-described embodiments of the invention provide the following main advantages:

During normal operation conditions, which prevail for most of the time, the current limiting circuit provide negligible resistance and, hence, consumes little power.

Through use of a supercapacitor in parallel with the load, and the limiting of the current from the power source, it is possible to keep the power source within specification while accurately powering high peak power circuitry.

From the perspective of the power source, there is provided an averaging effect for power consumption. This is particularly useful for battery sources, but also has design advantages for all sources. That is, it allows for the use of more cost effective components in the power source as greater certainty is obtained about the load characteristics. Putting this in another way, the design of the power source is able to take advantage of the reduced peak current demands.

The supercapacitive device is able to be simply connected in parallel with the load (and the output terminals) with minimal other circuitry. That is, There is no need to switch the supercapacitor device into and out of connection within the load.

The current limiter provides for a low resistance mode and a linear mode, although the design is such that the limiter will remain in the low resistance mode for most of the time.

Allows the use of pulsed loads in some prior situations where power supply limitations prevented this from occurring.

Allows prior power supplies to remain within specification for pulsed lead of the type described.

Relatively few components are required and power consumption, on average is low, making the embodiments particularly suitable to low power applications such as portable electronic devices that rely occasionally, regularly or exclusively upon batteries or other portable power sources.

Small in volume and, as such, more easily able to be either retrofitted into existing housing of electronic devices or designed into new housing for such devices.

Although the invention has been describes with reference to specification examples, it will be appreciated by those skilled in the art that is may be embodied in many other forms.

APPENDIX A cap-XX APPLICATION NOTE

Start-Up Current-Limiters for Supercapacitors in PDAs, Other Portable Devices & Wireless Applications

OUTLINE

Supercapacitors with low ESR (Equivalent Series Resistance) and high capacitance are ideal components for use in pulsed-power applications, such as GSM and GPRS transmitters, in which the load draws large pulses of current. When appropriately selected and connected across the supply, they provide much of the energy needed by each load pulse, reducing voltage ripple and instantaneous supply current. However, they can draw a high charging current when the device is turned on. This can cause a battery to shut down, or the supply voltage in a host device to drop because of overloading. This application note describes a number of current-limiting circuits that operate on power-up and/or during operation, allowing the supercapacitor to charge without overloading the supply.

THE PROBLEM

Portable devices, such as PDAs and hand-held bar-code scanners, are shrinking in size with each new design. Devices designed to fit into host devices, like PC-Card and Compact Flash devices, must fit into very small spaces and still be able to operate from a power supply that can deliver limited current and power. This makes designing these devices difficult, as GSM and GPRS transmissions (and other applications) require bursts of high power that the supply may not be capable of providing.

A solution to the power problem is to use a cap-XX supercapacitor with high capacitance and low ESR on the power rail. The low ESR enables the supercapacitor to deliver high power (with only a small voltage drop at the beginning of the peaks), while the high capacitance stores sufficient energy to power the load during the load pulses without a significant voltage droop. The supercapacitor is re-charged between load pulses. However, the large capacitance may introduce a new problem, which is the high charging current it requires on power-up. If the system is being powered by a battery, the high current may blow a fuse or cause the battery to shut down. If the power source is a host's power rail, the specification may prohibit the subsystem from drawing more than a certain amount of current.

How can the power-up charging current be limited to a safe value without compromising operation of the system?

THE CAP-XX SOLUTION

A solution to the start-up current problem is to limit it to a safe, known value until the supercapacitor is charged. This Application Note describes circuits that are designed to do this. The MOSFET switch in two of the designs stays on after the initial charging current has stopped flowing, with the result that they will not limit the current during normal operation. The third can be used in a mode that limits the current at any time, which prevents high currents if the system is disconnected from its host and then re-connected while the supercapacitor is still partially charged. During operation, the third solution limits the current based on its actual value, instead of relying only on the low supercapacitor ESR relative to the source impedance.

CIRCUIT OPERATION

Introduction

The first two circuits described here are designed to limit the current delivered to the supercapacitor when the power is first applied to the circuit, so that the supercapacitor charges without imposing a high current load on the supply. For applications in which the supercapacitor may remain charged after disconnection from the supply and then be connected to a partially-discharged battery or a lower-voltage power rail, some additional circuitry (not shown) may be required to prevent current flow back from the supercapacitor to the battery/supply.

The first design discussed (see Figure 1) uses a series resistor to limit the initial charging current. This is simpler and may cost less than the second circuit, but has the disadvantage that the charging current decreases as the supercapacitor charges up, in a simple exponential way. This means the supercapacitor takes longer to charge than it might from a constant-current source.

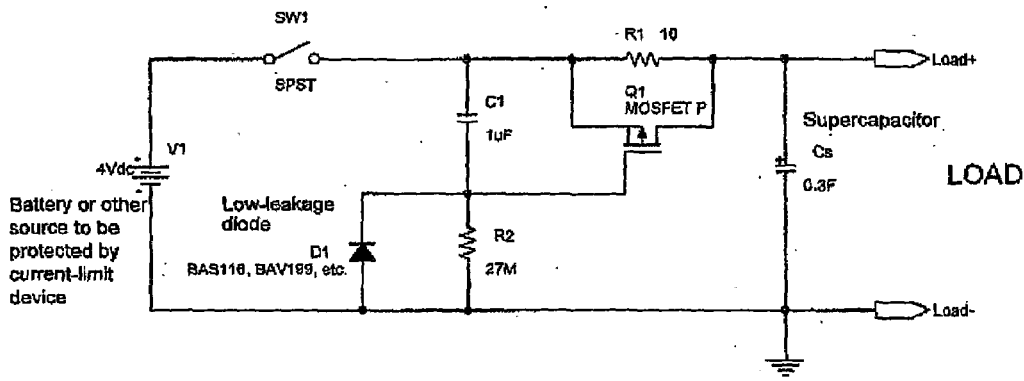

Figure 1: Simple Current-Limiter Circuit Using Series Resistor

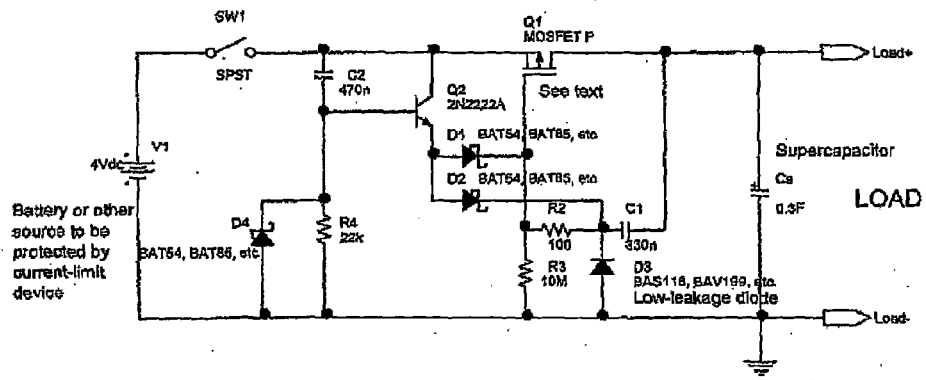

Figure 2: Current-Limiter Circuit Using MOSFET in Constant-Current Design

The second design (see Figure 2) uses the MOSFET to charge the supercapacitor in a current-limiting design. The series resistor used in the first design is not required, although some extra circuitry is used to control the gate voltage of the MOSFET. It has the advantage that the supercapacitor takes less time to charge if the same maximum-current criterion is used as in the circuit of Figure 1. Importantly, the MOSFET selected for Figure 2 must be able to dissipate the heat generated during the charging phase. This is a one-off event each time the device is turned on that typically lasts only a few seconds, so the MOSFET need not be rated to dissipate that amount of power continuously.

The designs shown here are intended to be adapted for operation at various different supply voltages. The lowest supply voltage that the MOSFET will be able to pass a current without dropping the voltage is determined by its threshold voltage and its output characteristics. To pass a given current, the device should be turned on sufficiently hard to reduce $R_{DS(ON)}$ to a low value. The smaller the threshold voltage, the lower the supply voltage at which the circuit will work successfully and reliably.

An example of a device that should function well at low voltages is IRL5602S, which has a rated gate threshold voltage, $V_{GS(th)}$, of -0.7V to -1.0V. Another is FDR838P, a SuperSOT-8 device, which has a $V_{GS(th)}$ range of -0.4V to -1.5V (typically -0.85V), but a low power rating. The designer should also take into account the supply voltage, maximum load current and power dissipation, etc., in selecting the right MOSFET. Some SuperSOT-8 devices and other small types may be suitable, provided they can dissipate the power during the turn-on charging without becoming too hot. Since it can be difficult to estimate or model the temperature increase of the MOSFET during start-up charging, some experimentation may be required to verify that a device is suitable. After turn-on, the MOSFET should dissipate relatively little power.

Note that, when working with the above circuits, an oscilloscope probe with an impedance of 10MΩ will have a big effect on normal operation if it is connected to the high-value resistors at the MOSFET gates. Only very high input impedance devices (preferably >1GΩ) should ever be connected to these points.

Figure 3: Current-Limiter Circuit Using Operational Amplifier and MOSFET in Constant-Current

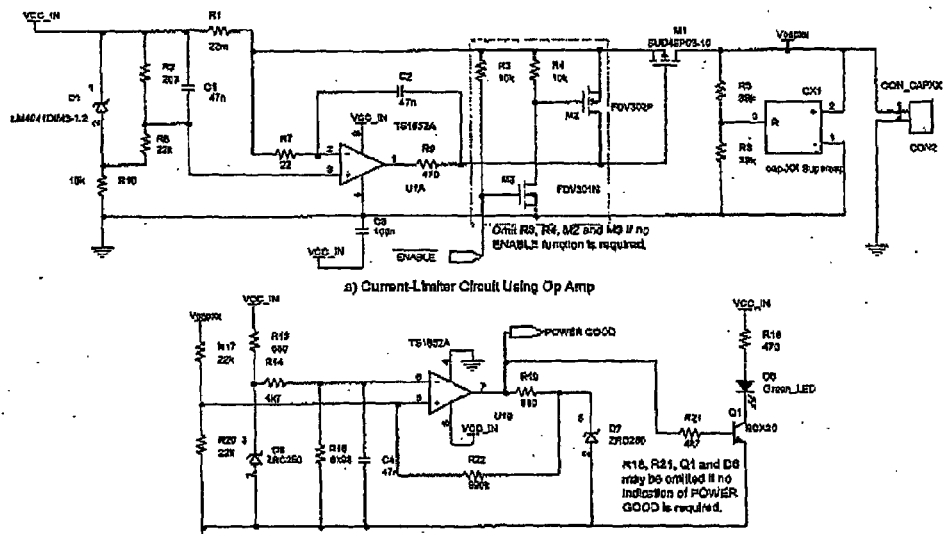

a) Current-Limiter Circuit Using Op Amp b) "Power-Good" Circuit

Feedback Design With Optional ENABLE and "POWER GOOD" Circuits

The third design, shown in Figure 3, measures and controls the current delivered to the supercapacitor by means of an operational amplifier and MOSFET. The component values in the circuit were selected for operation at 3.3V. This circuit avoids the problems associated with high current loads on the supply (or host) if the device is disconnected from the supply and then re-connected before the supercapacitor has been discharged fully. If enabled, it will limit the current drawn from the supply at any time that the load draws a high current. With the low-cost operational amplifiers used, the response speed is good enough to protect the source on start-up and if there is a sustained high load, but note that it may not be fast enough to respond during a short-duration load pulse.

The circuit in Figure 3(a) is ideal for PC Card and CF Card applications when the designer wishes to make sure that the design complies with the specification, rather than relying on the source impedance of the host device and the ESR of the supercapacitor to limit the current. Relying on the source impedance of the host is particularly problematic, as there is a wide variation in this value between products. The designer need only ensure that the circuit with the current-limiter operating will still provide adequate current for the load.

The portion of Figure 3(a) enclosed in the dotted rectangle is an optional "enable" circuit. If an "enable/disable" function is not required, these components are omitted.

Also shown, in Figure 3(b), is a circuit that generates a POWER GOOD output when the voltage on the supercapacitor has reached a desired value. This circuit is optional and may be used with any of the current-limiter circuits presented.

Simple Series Resistor Design

Referring again to Figure 1, the main current-limiting element in this circuit is the series resistor, $R_1$. This circuit is designed so that when $SW_1$ is closed, the supercapacitor is charged via $R_1$ until its voltage is nearly equal to the supply voltage. In this example, $R_1$ was selected to give a peak current of 400mA with a 4V supply. $C_1$ is initially discharged, which ensures that the MOSFET is off. $C_1$ then charges up via $R_2$ and turns on the MOSFET later. Reference is made to Figure 4 for the charging waveforms over the first few seconds. Note that the lowest waveform on the right is the supply current (100mA/div). The moment when the MOSFET turns on can clearly be seen where the current increases briefly, before again falling as the supercapacitor reaches the supply voltage.

The values of $R_2$ and $C_1$ are selected to allow enough charging time so that the increased current when the MOSFET comes on is well under the design limit. The moment of turn-on will vary with the threshold voltage of the MOSFET, so some allowance should be made in the timing for variations in component characteristics between devices and with temperature. $C_1$ may be a lower value than that shown, with an appropriate higher value of $R_2$. However, $C_1$ should be high enough to swamp the value of the MOSFET's gate input capacitance, so that the timing is not affected by variations in MOSFET characteristics. The value used here, 1μF, would be more than sufficient in most circumstances. As a guide, $C_1$ should be more than 10 times the input capacitance of the MOSFET, and 100 times or more should be suitable in most cases. $D_1$ should be a device with low

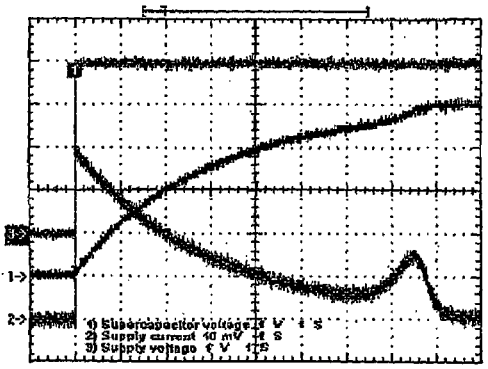

Figure 4 Current (100mA/div) and Voltage Waveforms (1s/div) for Example in Figure 1 (using high reverse-current diode as $D_1$, instead of recommended one).

reverse current, so it does not affect the charging of $C_1$.

If the MOSFET has a low gate threshold voltage, $V_{GS(th)}$, then a longer $R_2C_1$ product will be required than would be the case for a higher $V_{GS(th)}$. This is because the MOSFET with the lower threshold will tend to turn on earlier. If the MOSFET turns on too soon, it will make a low-resistance connection between the supply and the supercapacitor, causing too large a current to flow. A low value of $V_{GS(th)}$ is generally desirable in low-voltage applications, in order to make sure that the MOSFET is turned on as hard as possible after the initial charging phase, to reduce its on-resistance.

The following illustrates how to calculate component values in the circuit in Figure 1. The initial peak current drawn by the current-limiter is determined from Ohm's Law, as follows:

$$i_{Peak} = V/R_1 \qquad (1)$$

where $V$ is the supply voltage. Select $R_1$ according to the initial peak current your application can support.

The next step is to estimate the voltage to which the supercapacitor should be charged (through $R_1$) before switching on the MOSFET. Assume the maximum current the application can support is $i_{MAX}$. Since the series resistor, $R_1$, is still carrying current at the time the MOSFET turns on, this estimate aims for a current of about half the maximum. If the ESR of the supercapacitor is $R_S$, the on-resistance of the MOSFET is $R_{DS(ON)}$ (at the supply voltage), the voltage on the supercapacitor $v_S$, the source internal resistance is $R_B$, and we assume the MOSFET turns on instantly (which is conservative), then the current through the MOSFET at the instant it turns on will be the following:

$$i_{MOSFET} = (V_{Supply} - v_S)/(R_S + R_{DS(ON)} + R_B) = 0.5i_{MAX} \qquad (2)$$

or, the voltage on the supercapacitor at the moment the MOSFET should turn on is $$v_S = V_{Supply} - 0.5i_{MAX}(R_S + R_{DS(ON)} + R_B) \qquad (3)$$

The time (in seconds) at which the supercapacitor reaches this voltage is determined from the following equation:

$$t_{ON} = -R_1C_S log_e(1 - v_S/V_{Supply}) \qquad (4)$$

$t_{ON}$ is the time after $SW_1$ has been closed that the MOSFET should switch on. This is the time required for the gate to reach the gate-source threshold voltage, $V_{GS(th)}$, and is given (in seconds) by the following equation:

$$t_{ON} = -R_2C_1 \cdot log_e(|V_{GS(th)}|/V_{Supply}) \qquad (5)$$

Re-arranging (5):

$$R_2C_1 = -t_{ON}/log_e(|V_{GS(th)}|/V_{Supply}) \qquad (6)$$

Choose a value of $C_1$ such that $C_1 \gg$ gate capacitance of the MOSFET, say 1μF, then determine $R_2$.

The calculated values, although suitable for design purposes, will be approximate and may need to be adjusted after testing the circuit. It will be necessary to verify that the current does not exceed the desired value, using a few sample MOSFETs in the temperature range of interest. If the current is much lower, then a lower value of $R_2$ could be tried; if the current is too high, then a larger value of $R_2$ should be used, to increase the time before the MOSFET is turned on.

When the supply voltage drops to zero ($SW_1$ is opened and the load discharges the supercapacitor), $D_1$ discharges $C_1$ so that the circuit is immediately ready for use again. $D_1$ need not be a power device, but should at least be able to handle the capacitor's discharge current at the anticipated rate of fall of the supply voltage. ($I = C_1 dV/dt$, = 1mA for $C_1$ = 1μF, assuming a very high discharge rate of 1V/ms. Most common small-signal diodes can handle this current.)

Some typical starting values of components are given in Table 1 for a supply source impedance of 150mΩ and supercapacitor ESR of 80 mΩ. Values are as given by the equations, so the designer is able to choose the next-highest standard resistor value. These values should be verified and, if required, modified to obtain the desired behaviours in a circuit that is designed.

| Circuit Parameters: Supply voltage $V$ = 4.0V, MOSFET $V_{GS(th)}$ = -1.0V, $R_{DS(ON)}$ = 30mΩ, Source impedance $R_B$ = 150mΩ, and $C_1$ = 1µF ||||||
|---|---|---|---|---|
| $I_{MAX}$ = 400mA ||||||
| cap-XX Supercapacitor Type | $R_1$ from (1) | $v_S$ from (3) | $t_{ON}$ from (4) | $R_2$ from (6) |
| GW-02-01 300mF 80mΩ | 10 | 3.95 | 13.0 | 9.4MΩ |
| GW-02-02 380mF 70mΩ | 10 | 3.95 | 16.7 | 12MΩ |
| GW-02-03 450mF 55mΩ | 10 | 3.95 | 20 | 14.4MΩ |
| GW-02-04 800mF 80mΩ | 10 | 3.95 | 34.7 | 25MΩ |
| GW-02-05 220mF 105mΩ | 10 | 3.94 | 9.35 | 6.7MΩ |
| GW-02-06 120mF 60mΩ | 10 | 3.95 | 5.31 | 3.8MΩ |
| $I_{MAX}$ = 1.0A ||||||
| GW-02-01 300mF 80mΩ | 4 | 3.87 | 4.11 | 3MΩ |
| GW-02-02 380mF 70mΩ | 4 | 3.88 | 5.27 | 3.8MΩ |
| GW-02-03 450mF 55mΩ | 4 | 3.88 | 6.35 | 4.6MΩ |
| GW-02-04 800mF 80mΩ | 4 | 3.87 | 11.0 | 7.9MΩ |
| GW-02-05 220mF 105mΩ | 4 | 3.86 | 2.93 | 2.1MΩ |
| GW-02-06 120mF 60mΩ | 4 | 3.88 | 1.68 | 1.2MΩ |

Table 1: Approximate Starting Values of $R_1$ and $R_2$ (for a design based on Figure 1) vs Supercapacitor Type and Maximum Supply Current The value of the capacitance of $C_S$ does not affect the initial peak current. In the design process, $C_S$ would have been chosen to be large enough value to enable the supercapacitor to maintain the supply voltage during load peaks. The ESR of the supercapacitor would also have been selected to optimise the voltage droop during load pulses. The ESR of the cap-XX device shown in Figure 1 is 80mΩ, which is too small to make a substantive difference to the peak current calculation.

The resistor $R_1$ dissipates power while the supercapacitor is being charged. In the example shown, a power rating of 0.5W was adequate, even though the power dissipated the instant after $SW_1$ was closed was 1.6W. The instantaneous power reduced very quickly after switch-on, resulting in only modest heating of $R_1$. If a higher supply voltage or a larger supercapacitor was used, it might be necessary to increase the resistor's power rating and physical size.

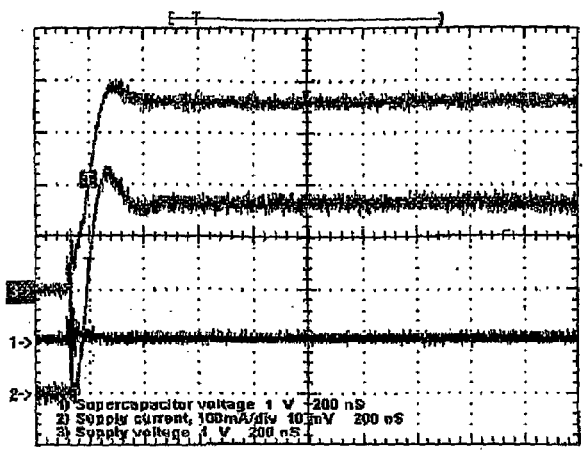

Figure 5: Transient Voltage and Supply Current Response of Circuit in Figure 1

As seen in Figure 4, the total time taken to charge the GW-02-01 supercapacitor to the supply voltage was approximately eight seconds with this circuit configuration, and $i_{MAX} = 400mA$.

The peak current drawn by the current-limiter circuit when $SW_1$ is first closed is of interest, as the aim of the circuit is to prevent high currents being drawn from the supply. Figure 5 shows typical current and voltage waveforms for the circuit in Figure 1. The initial current peak is a result of the charging of the MOSFET parasitic capacitances, and the apparently steady current that follows is actually the beginning of the exponential decay curve of the charging of the supercapacitor. The current exceeds the intended limit (400mA) for only a few nanoseconds. This waveform varies somewhat from one switch-on event to the next, depending on how cleanly the switch operates.

MOSFET dv/dt Current-Limiter Design

Referring to Figure 2 there is illustrated the main current-limiting element in this design, which is the MOSFET, $Q_1$. This is held in the off state until a short time after $SW_1$ is closed. This is done by the action of the emitter-follower $Q_2$, with $C_2$ initially discharged and providing its base current.

Once enough time has elapsed for $C_1$ to be fully charged via $D_2$ and $C_S$ (and/or the load), $C_2$ has charged via $R_4$, and $Q_2$ turns off. This then allows $C_1$ to begin to discharge via $R_3$, with a relatively long time constant. When the gate of $Q_1$ drops to the threshold voltage below $Q_1$'s source voltage (the supply voltage), $Q_1$ begins to turn on, which starts to charge $C_S$. Because $C_1$ is connected to $C_S$, there is a negative feedback effect: As the voltage on the supercapacitor rises, it tends to turn off $Q_1$ via $C_1$.

The rate at which the supercapacitor is charged is thus limited, resulting in an approximately fixed charging current until it is fully charged. Then the MOSFET is finally turned on with the full supply voltage at its gate, resulting in the minimum drain-source resistance that it is possible to get with the given supply voltage. The charging current is determined mainly by the values of $C_S$, $R_3$ and $C_1$, with the characteristics of the MOSFET having a secondary effect. $D_3$ should have a low reverse current, so that it does not affect the supercapacitor's charging current. Likewise, the emitter cutoff current ($I_{BEO}$) of $Q_2$ is relatively low (less than 10nA, in this case), which has the same advantage.

Although the circuit is slightly more complex than that in Figure 1, it has design advantages in that it is easier to more accurately predict the charging current for particular component values. The current through $R_3$ during the charging phase is determined from the voltage drop across it, which is just the supply voltage less the threshold voltage of the MOSFET, as follows:

$$i_{R3} = (V_{Supply} - |V_{GS(th)}|)/R_3 \qquad (7)$$

where the positive value, $|V_{GS(th)}|$, is used for convenience.

The rate of change of voltage on $C_1$ is determined from the current passing through it, as follows, in volts per second:

$$dv_{C1}/dt = i_{R3}/C_1 \qquad (8)$$

Since $C_1$ is connected to the supercapacitor on the right and its voltage at the gate of the MOSFET tends to remain at the MOSFET's threshold voltage below the supply, the supercapacitor's rate of change of voltage is approximately the same as that of $C_1$. Therefore, the charging current into the supercapacitor, which is essentially the same as the supply current, is given by the following:

$$i_{Charging} = i_{Supply} = C_S(dv_{C1}/dt) \qquad (9)$$

Combining equations 7, 8 and 9 above, we have:

$$R_3 C_1 = C_S \cdot (V_{Supply} - |V_{GS(th)}|) / i_{Charging} \qquad (10)$$

For example, one may wish is to limit the charging current to 0.4A while using the component values in Figure 2. Hence, if $V_{GS(th)} = -1$:

$$R_3 C_1 = 0.3F \cdot (4.0V - |-1.0V|) / 0.4A = 0.3 \cdot 3 / 0.4 \text{ s} = 2.25 \text{ s}$$

If the following component values were chosen: $C_1 = 220nF$, then $R_3 = 2.25 / 220 \times 10^{-9} \, \Omega = 10.227 M\Omega \approx 10 \, M\Omega$.

Checking the result with the values chosen, $i_{Charging} = C_S \cdot (V_{Supply} - |V_{GS(th)}|) / R_3 C_1$ or $\quad i_{Charging} = 0.3 \cdot 3 / 2.20 = 0.41A$ For a capacitor, $i = C \, dv/dt$. For constant current, this reduces to $i = C\Delta v/\Delta t$, where $\Delta v$ is the change in voltage across the capacitor in time $\Delta t$. Therefore, to charge a supercapacitor from 0V to the supply voltage, the time taken will be:

$$\Delta t = V_{Supply} \cdot C_S / i_{Charging} \qquad (11)$$

In the example above, the time required to charge the supercapacitor is 4.0V·0.3F / 0.41A = 2.93s, which corresponds well with the waveforms in Figure 5.

As in the previous circuit, it is desirable to choose a value of $C_1$ that is much larger than the input capacitance of the MOSFET, in order to eliminate variability in the charging current and also so that it can be calculated with reasonable accuracy.

$D_1$ is needed only as a belt-and-braces mechanism to prevent the bipolar transistor, $Q_2$, from possibly being exposed to reverse base-emitter voltage in those applications where the supply voltage is higher than its limit. (In any event, the current would be limited by $R_4$.)

$D_2$ is used to charge $C_1$ initially, in preparation for its discharge (and re-charging with opposite polarity) via $R_3$. The value of $R_2$ is not important, provided it is very much less than that of $R_3$; a value of 1kΩ could be used instead, for example.

It is necessary that the MOSFET is off initially, so the gate voltage must be kept high enough at first. Subsequently, there is a "dead time" in the circuit, during which the gate voltage is dropping towards its threshold point. The value of the voltage at the junction of $C_1$ and $R_2$ just after $SW_1$ is closed (and $C_1$ is charged up) effectively determines how long the dead time will be after $Q_2$ turns off. If the threshold voltage of the MOSFET is very far below this value, it will take some time for the MOSFET to begin to turn on and for charging of the supercapacitor to begin. If this time is too long, a MOSFET with a smaller threshold voltage can be substituted, or the initial gate voltage can be reduced by using two schottky diodes in series at $D_2$, or by using a silicon diode, such as a 1N914, or equivalent, or by using a series combination of these.

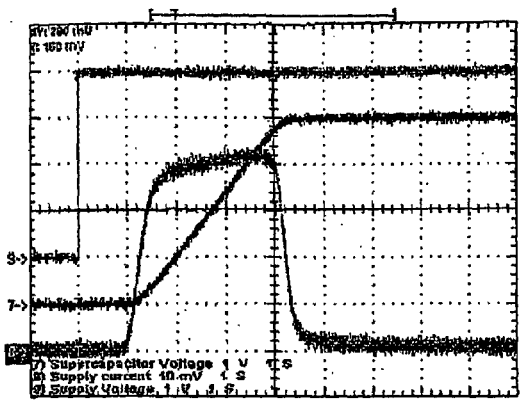

Figure 6: Charging Waveforms Obtained with Circuit in Figure 2, with $C_1$ = 220nF (using diode with relatively high reverse current as $D_3$, instead of recommended one).

Diodes $D_3$ and $D_4$ discharge the timing capacitors after power-down, so that the circuit is ready to operate again.

The time constant $R_4C_2$ is not a critical value and it need only be long enough to be sure that $C_1$ has been charged fully before $Q_2$ turns off. Bear in mind that there must be sufficient base current available to keep $Q_2$ on for a short time, while charging $C_1$.

The following outlines an approximate method for choosing $Q_2$ and estimating required values of $R_4$ and $C_2$, for a value of $C_1$ (determined above). First, note that $Q_2$ performs two functions: one is to ensure that $Q_1$ is kept turned off immediately after $SW_1$ is closed; and the other is to charge $C_1$ very quickly. Its base drive is provided by $C_2$, which must therefore be large enough to deliver the drive for long enough to make sure that $C_1$ is charged. As soon as $C_1$ is charged, the current-limiting phase of the circuit described above can begin.

Taking advantage of the gain of $Q_2$, a relatively small capacitance at $C_2$ enables $Q_2$ to perform both the above tasks. $Q_2$ should be a reasonably fast switching transistor with reasonably high gain. The minimum gain of a 2N2222A (or 2N2222) varies quite widely (for example, 35 to 100 at $V_{CE}$ = 10V), but it is typically found to be adequate. There are, no doubt, many equivalent or better devices that are known to designers, whether those devices be surface-mount or through-hole types.

By design, $C_1$ is much larger than the input capacitance of the MOSFET, so the latter is insignificant. Provided $Q_2$ has the gain of a 2N2222A or better, then a value of $C_2$ that is comparable to that of $C_1$ should be adequate. That is, something in the range of $0.5C_1$ to $2C_1$ (or more, if desired) should perform adequately.

Next, there is a need to determine $R_4$. This is found from the time constant $R_4C_2$. $C_1$ should charge relatively quickly via $D_2$ when $SW_1$ closes, but there is some uncertainty in estimating that time. The value of $R_2$ chosen in Figure 2 was selected to give what is really quite a large time constant (10ms) relative to the expected time to charge $C_1$, but this is still negligible relative to the time required to charge the supercapacitor, so it has no real detrimental effect. Making $R_4$ too small (say, sub-1kΩ) may contribute to the transient initial current that flows when $SW_1$ is closed, which is undesirable. If $R_4$ is very high (say, in the range >>1MΩ, with a correspondingly low value of $C_2$), $Q_2$ may not turn off properly.

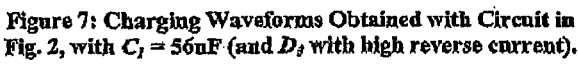

Figure 7: Charging Waveforms Obtained with Circuit in Fig. 2, with $C_1$ = 56nF (and $D_3$ with high reverse current).

As seen in Figure 6, the current during charging is relatively constant. There is a 1 second dead time in this example, and this could be reduced by the measures described above. Even with the dead time, the total charging time is just over 4 seconds, compared with approximately 8 seconds for the circuit in Figure 1, when using approximately the same peak current.

Figure 7 shows the circuit of Figure 2 with a charging current of approximately 1.5 Amps. The dead time before charging begins is only about 250 ms with this value of $C_1$, and the total time to charge the supercapacitor is about 1.2 seconds.

Table 2 is a list of some component values for different charging currents, using the circuit in Figure 2.

| Circuit Parameters: Supply voltage $V = 4.0V$, and MOSFET $V_{GS(th)} = -1.0V$ | | | | | | |
|---|---|---|---|---|---|---|
| $i_{Charging} = 400mA$ | | | | | | |
| Supercapacitor | $R_3C_1$ from (10), s | Select $C_1$, nF | Calc. $R_3$, Ω | Select $R_4C_2$, s | Select $C_2$, nF | Calc. $R_4$, Ω |
| GW-02-01 300mF 80mΩ | 2.25 | 220 | 10M | 0.01 | 470 | 21.2k |
| GW-02-02 380mF 70mΩ | 2.85 | 220 | 13M | 0.005 | 330 | 15k |
| GW-02-03 450mF 55mΩ | 3.375 | 330 | 10.5M | 0.01 | 330 | 30.1k |
| GW-02-04 800mF 80mΩ | 6 | 220 | 27.4M | 0.01 | 220 | 45.3k |
| GW-02-05 220mF 105mΩ | 1.65 | 220 | 7.5M | 0.01 | 220 | 45.3k |
| GW-02-06 120mF 60mΩ | 0.9 | 180 | 4.99M | 0.01 | 220 | 45.3k |
| $i_{Charging} = 1.0A$ | | | | | | |
| GW-02-01 300mF 80mΩ | 0.9 | 180 | 4.99M | 0.01 | 150 | 66.5k |
| GW-02-02 380mF 70mΩ | 1.14 | 180 | 6.34 | 0.01 | 150 | 66.5k |
| GW-02-03 450mF 55mΩ | 1.35 | 180 | 7.5M | 0.01 | 220 | 45.3k |
| GW-02-04 800mF 80mΩ | 2.4 | 180 | 13.3M | 0.01 | 220 | 45.3k |
| GW-02-05 220mF 105mΩ | 0.66 | 330 | 2M | 0.005 | 220 | 22.6k |
| GW-02-06 120mF 60mΩ | 0.36 | 330 | 1.1M | 0.005 | 220 | 22.6k |

Table 2 (Above): Examples of Values of $R_3$, $C_1$, $R_4$ and $C_2$ for a design based on Figure 2 vs Supercapacitor Type and Maximum Supply Current

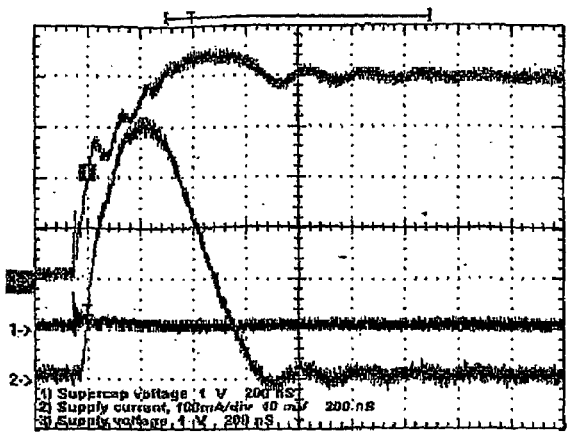

Figure 9: Initial Transient Waveforms Obtained with Circuit in Figure 2, with $C1 = 56nF$.

Figure 8 illustrates the robustness of the circuit in Figure 2 when $SW_1$ is repeatedly opened and closed while charging is in progress. Each time the switch is closed again, the charging continues from where it left off, without the current rising to excessive levels.

Figure 9 shows the transient supply current and the voltage waveforms obtained with the circuit in Figure 2. The current peak on closing the switch results from charging $C_1$ and from the charging of the parasitic capacitances of the MOSFET. The peak current is about 500 mA for several nanoseconds, after which it falls to nearly zero and remains there until charging of the supercapacitor begins.

Feedback Control Design

Figure 3(a) is a current-limiter circuit that monitors the actual current and uses feedback to control current flow through the MOSFET. The supercapacitor charged by the circuit is represented by CX1. It has two cells in series, and its associated balancing resistors are $R_5$ and $R_6$. The limiting current value is independent of the supercapacitor value and there are therefore no tables of suitable supercapacitors presented here.

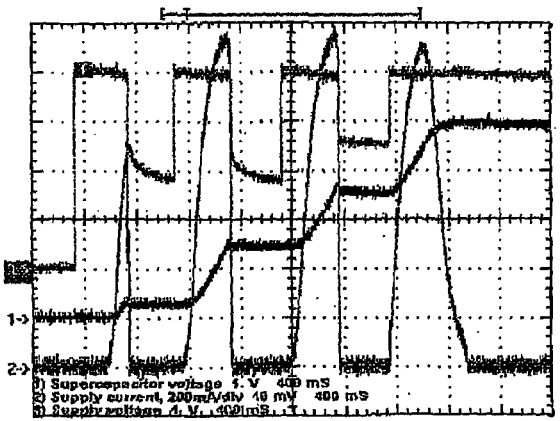

Figure 8: Charging Waveforms Obtained with Circuit in Figure 2, with $C_1 = 56nF$, and with $SW_1$ Repeatedly Opened and Closed.

The circuit in Figure 3(b) detects when the voltage on the supercapacitor has reached a predetermined value and outputs a "POWER GOOD" (active high) signal that may be used to signal to other circuits that the supercapacitor is fully charged. The circuits (a) and (b) are designed to operate from a nominal 3.3V supply, although they will function at voltages at least as low as 3V and (preferably with suitable resistor changes) up to 4.5V, the rated voltage of the two-cell supercapacitor.

The circuit in (a) monitors the current by comparing the voltage drop across a shunt resistor ($R_1$) with a reference voltage derived from a low-power voltage reference IC. If the voltage across the shunt exceeds the reference value, the current is too high and the operational amplifier output begins to turn off the MOSFET, $M_1$. When the supercapacitor is charged, the current drops and $M_1$ is turned on fully again.

If the optional "ENABLE" circuit is included, then a logic 0 signal (0V) applied to the input is required to enable the current-limiter circuit to operate; if the input is high or left floating, then $M_1$ is held off by $M_2$, with the result that there is no current flow to the load.

The voltage reference circuits $D_1$, $D_6$ and $D_7$ are selected for their accuracy and low power consumption. In some cases these circuits are replaced with cheaper zener diodes, if required, provided the parts used have good tolerances (preferably 1%) across the temperature range of operation. Otherwise the limit current and the voltage at which the POWER GOOD signal is generated might be incorrect. Zener diodes will typically require higher bias currents, resulting in increased power consumption by the circuit.

The operational amplifier TS1852A has a maximum input offset voltage of 1 mV and a typical value of 0.1 mV. Since this parameter affects the accuracy of the limit current and the POWER GOOD signal, amplifiers with higher offset voltages should not be used. Note also that if the POWER GOOD circuit is used separately, its operational amplifier's power supply should be bypassed with a 100 nF capacitor.

The POWER GOOD circuit in (b) compares a proportion of the voltage across the supercapacitor with a reference voltage. When the supercapacitor's voltage exceeds a predetermined value, the POWER GOOD output goes high. Some hysteresis is introduced via the feedback resistor, $R_{22}$.

Figure 10 shows the voltage and current waveforms for a circuit of the type in Figure 3, with components selected for a 2 Amp current limit. The Lithium-ion battery supplying the circuit had a fully-charged voltage of 4.2 Volts. During the current-limiting period in Figure 10, the battery's voltage was reduced by the voltage drop in its internal resistance under load.

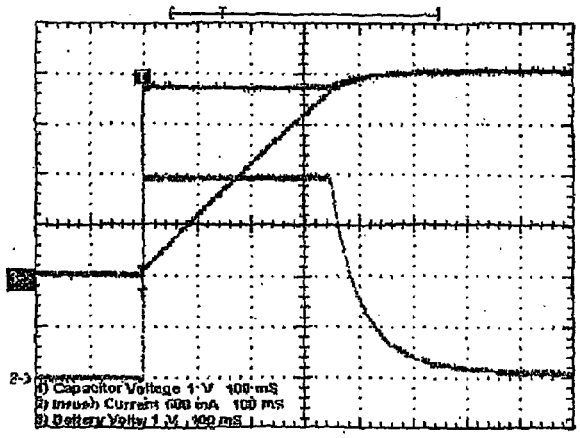

Figure 10: Voltage and Current Waveforms from Circuit in Figure 3. Component Values Selected for Battery Voltage 4.2 Volts, Current Limit 2 Amps. "Inrush Current" is Battery Current.

Relationship between maximum current and component values: The current limit in Figure 3(a) is selected by appropriate choice of the resistors in the voltage divider across the reference voltage, i.e., $R_2$ and $R_6$. First, the shunt voltage when the current is at its limiting value is given by:

$$v_{R1} = i_{Lim} \cdot R_1 \quad (12)$$

The voltage at the non-inverting input of the operational amplifier at the moment the current-limiting begins will be:

$$v_+ = \frac{R_2}{R_2 + R_6} V_{D1} \quad (13)$$

where $V_{D1}$ is the voltage across $D_1$. Equating (12) and (13), the following result is provided for the limiting current as a function of the resistor values:

$$i_{Lim} = \frac{R_2}{R_1(R_2 + R_6)} V_{D1} \quad (14)$$

Alternatively, it is possible to express the value of $R_2$ in terms of the desired maximum current and the other values, as follows:

$$R_2 = \frac{i_{Lim} R_1 R_6}{V_{D1} - i_{Lim} R_1} \quad (15)$$

*Example:* Using the values given in Figure 3, which include a 1.2 Volt reference for $D_1$, and if the desired maximum current is 500 mA, Equation 15 gives 203 Ω for the value of $R_2$.

Relationship between POWER GOOD threshold voltage on the supercapacitor and the component values: reference is made to Figure 3(b). If the output of the operational amplifier is low because the voltage on the supercapacitor is low, then the voltage at the non-inverting input may be shown to be the following:

$$v_{+(PGLow)} = \frac{v_{S(PGLow)}}{R_{17}(1/R_{20} + 1/R_{22}) + 1} \quad (16)$$

where $v_{S(PGLow)}$ is the voltage on the supercapacitor. Likewise, if the output of the operational amplifier is high because the voltage on the supercapacitor is above the reference value, then the voltage at the non-inverting input may be shown to be the following:

$$v_{+(PGHigh)} = \frac{v_{S(PGHigh)} R_{20} R_{22} + V_{D7} R_{17} R_{20}}{R_{17} R_{22} + R_{20} R_{22} + R_{17} R_{20}} \quad (17)$$

where $V_{D7}$ is the voltage on the reference device connected to $R_{22}$. However, the switching points in the POWER GOOD signal occur when each of $v_{+(PGLow)}$ and $v_{+(PGHigh)}$ is equal to the voltage at the inverting input. The reference voltage at the inverting input to the amplifier is given by the following:

$$v_- = \frac{R_{16}}{R_{14} + R_{16}} V_{D5} \quad (19)$$

where $V_{D5}$ is the voltage at the reference IC/diode, $D_5$. The supercapacitor voltage at which the POWER GOOD signal changes from low to high as the supercapacitor charges is when $v_{+(PGLow)}$ (Equation 16) is equal to $v_-$ (Equation 19), as follows:

$$v_{s(PGLow)} = \frac{V_{D5} R_{16} [R_{17}(1/R_{20} + 1/R_{22}) + 1]}{R_{14} + R_{16}} \quad (20)$$

Similarly, the supercapacitor voltage at which the POWER GOOD signal changes from high to low as the supercapacitor discharges is found by equating $V_{s(PGHigh)}$ (Equation 17) and $v_-$ (Equation 19), as follows:

$$v_{s(PGHigh)} = \frac{V_{D5}R_{16}(R_{17}R_{22} + R_{20}R_{22} + R_{17}R_{20})}{R_{20}R_{22}(R_{14} + R_{16})} - V_{D7}\frac{R_{17}}{R_{22}} \quad (21)$$

NOTE: As discussed above, "PGLow" and "PGHigh" refer to the state of the POWER GOOD signal at the time the voltage on the supercapacitor is considered. The effect of hysteresis is that the voltage $v_{s(PGLow)}$ is higher than the voltage $v_{s(PGHigh)}$.

Example: Using the component values given in Figure 3, which include 2.5 Volt reference devices as $D_5$ and $D_7$, the POWER GOOD circuit has a nominal switching voltage of 3.0 Volts (from Equation 19). When the supercapacitor is charging, the voltage at which POWER GOOD goes from low to high is $v_{s(PGLow)}$= 3.07V (from Equation 20). When the supercapacitor is discharging, the voltage at which POWER GOOD goes from high to low is $v_{s(PGHigh)}$= 2.93 Volts (from Equation 21).

Figure 11 shows the transient behaviour of the circuit in Figure 3, using components that give a current limit of 2 Amps, as in Figure 10. The circuit was disconnected from the battery and allowed to discharge the supercapacitor to about 3 Volts. It was then re-connected to the battery, resulting in a current of about 3.5 Amps for 80µs before the current-limiter responded, limiting the subsequent current to 2 Amps. The upper waveform at the right was the battery voltage during the current-limiting phase; the supercapacitor's voltage rose subsequent to re-connection to the battery, but the slope is not discernable in the short time covered by this trace.

A host device with sufficient decoupling on its supply could deliver the transient 3.5 Amp current without resetting itself.

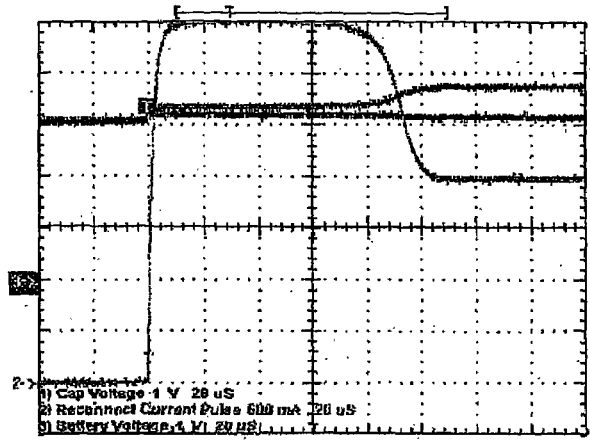

Figure 11: Transient Response of Circuit in Figure 3, with Components Selected for Current Limit of 2 Amps, Showing Re-Connection of the Circuit to the Battery Following Partial Discharge of Supercapacitor.

The invention claimed is:

1. A power supply for a load that demands an average load current and a peak load current that is higher than the average load current, the power supply including:
   input terminals for connecting with a power source that supplies a source current that is less than a predetermined current limit, wherein the predetermined current limit is less than the peak load current;
   output terminals for electrically connecting with the input terminals and the load; and
   a supercapacitor device in parallel with the output terminals for allowing the load to be supplied to the peak load current while substantially maintaining the source current at less than about the predetermined current limit.

2. A supply according to claim 1 wherein the predetermined current limit is between the average load current and the peak load current.

3. A supply according to claim 1 wherein the voltage at the input terminals is greater than or equal to the voltage at the output terminals.

4. A supply according to claim 1 that maintains the input and the output terminals at substantially the same voltage.

5. A supply according to claim 1 wherein the supercapacitor device includes one or more supercapacitors in parallel with the output terminals.

6. A supply according to claim 1 including a current limiter disposed between the input terminals and the output terminals.

7. A supply according to claim 6 wherein the current limiter maintains the source current at less than the predetermined current limit during charging of the supercapacitive device from the power source.

8. A supply according to claim 1 wherein the supercapacitor device includes a plurality of supercapacitors that are connected in parallel with each other.

9. A supply according to claim 1 wherein the supercapacitor device includes a plurality of supercapacitors that are connected in series with each other.

10. A supply according to claim 1 wherein the supercapacitor device has an ESR of less than 30 m$\Omega$.

11. A supply according to claim 10 wherein the supercapacitor device has an ESR of less than 24 m$\Omega$.

12. A supply according to claim 11 wherein the supercapacitor device has an ESR of less than 20 m$\Omega$.

13. A supply according to claim 1 wherein the supercapacitor device provides a capacitance of at least about 0.4 Farads.

14. A supply according to claim 1 wherein a footprint of the supercapacitor device is less than about 800 mm$^2$.

15. A supply according to claim 1, wherein the footprint of the supercapacitor device is less than about 40 mm×20 mm.

* * * * *